US006918405B2

(12) United States Patent
Leonhardt

(10) Patent No.: US 6,918,405 B2
(45) Date of Patent: Jul. 19, 2005

(54) FILL LIMIT VENT VALVE

(75) Inventor: Ralf Leonhardt, Mauldin, SC (US)

(73) Assignee: Alfmeier Corporation, Greenville, SC (US)

( * ) Notice: Subject to any disclaimer, the term of this patent is extended or adjusted under 35 U.S.C. 154(b) by 0 days.

(21) Appl. No.: 10/727,716

(22) Filed: Dec. 4, 2003

(65) Prior Publication Data

US 2005/0126633 A1 Jun. 16, 2005

(51) Int. Cl.[7] .............................................. F16K 24/04
(52) U.S. Cl. ........................................ 137/202; 137/43
(58) Field of Search ................................... 137/43, 202

(56) References Cited

U.S. PATENT DOCUMENTS

| 4,351,350 | A | 9/1982 | Crute |
| 4,392,507 | A | 7/1983 | Harris |
| 4,646,772 | A | 3/1987 | Bergsma |
| 4,655,238 | A | 4/1987 | Szlaga |
| 4,694,847 | A | 9/1987 | Szlaga |
| 4,699,638 | A | 10/1987 | Harris |
| 4,715,403 | A | 12/1987 | Szlaga |
| 4,735,226 | A | 4/1988 | Szlaga |
| 4,742,844 | A | 5/1988 | Szlaga |
| 4,753,262 | A | 6/1988 | Bergsma |
| 4,760,858 | A | 8/1988 | Szlaga |
| 4,790,349 | A | 12/1988 | Harris |
| 4,805,663 | A | 2/1989 | Szlaga |
| 4,815,705 | A | 3/1989 | Kasugai et al. |
| 4,886,089 | A | 12/1989 | Gabrlik et al. |
| 4,905,726 | A | 3/1990 | Kasugai et al. |
| 4,953,583 | A | 9/1990 | Szlaga |
| 4,982,757 | A | 1/1991 | Ohasi et al. |
| 4,991,615 | A | 2/1991 | Szlaga |
| 5,027,844 | A | 7/1991 | Forsythe |
| 5,028,244 | A | 7/1991 | Szlaga |
| 5,044,389 | A | 9/1991 | Gimby |
| 5,044,397 | A | 9/1991 | Szlaga et al. |
| 5,062,444 | A | 11/1991 | Bergsma |
| 5,065,782 | A | 11/1991 | Szlaga |
| 5,111,837 | A | 5/1992 | Morris et al. |
| 5,116,257 | A | 5/1992 | Szlaga |
| 5,183,087 | A | 2/1993 | Aubel et al. |

(Continued)

FOREIGN PATENT DOCUMENTS

EP        0941884        2/2003

(Continued)

OTHER PUBLICATIONS

Frohwein et al., U.S. Appl. No. 10/260,722, filed Sep. 30, 2002, entitled "*Vapor Control Valve with a Metallic Sealing Element*".

Primary Examiner—Gerald A. Michalsky
(74) Attorney, Agent, or Firm—Dority & Manning, P.A.

(57) ABSTRACT

A valve assembly for attachment in an aperture of a fuel tank wall includes a cap member with a nozzle, a carrier stage, a float stage, and a float housing. The carrier stage has a carrier carrying a sealing element with a relatively larger orifice opposing a relatively smaller orifice. The float stage includes a pivot pin and a float defining a stem. The pivot pin is movably located on the stem with the sealing element located apart from the float. The float contacts a portion of the sealing element during a refilling condition, and the sealing element seals the nozzle to prevent overfilling the fuel tank. The orifices permit the valve assembly to reopen in stages.

71 Claims, 9 Drawing Sheets

U.S. PATENT DOCUMENTS

| | | |
|---|---|---|
| 5,234,013 A | 8/1993 | Roetker |
| 5,234,022 A | 8/1993 | Harris |
| 5,261,439 A | 11/1993 | Harris |
| 5,402,818 A | 4/1995 | Kasugai et al. |
| 5,404,907 A | 4/1995 | Benjey et al. |
| 5,449,018 A | 9/1995 | Harris |
| 5,449,029 A | 9/1995 | Harris |
| 5,497,800 A | 3/1996 | Ohashi et al. |
| 5,518,018 A | 5/1996 | Roetker |
| 5,524,662 A | 6/1996 | Benjey et al. |
| 5,529,086 A | 6/1996 | Kasugai et al. |
| 5,535,772 A | 7/1996 | Roetker et al. |
| 5,566,705 A | 10/1996 | Harris |
| 5,582,198 A | 12/1996 | Nagino et al. |
| 5,603,349 A | 2/1997 | Harris |
| 5,640,993 A | 6/1997 | Kasugai et al. |
| 5,666,989 A | 9/1997 | Roetker |
| 5,678,590 A | 10/1997 | Kasugai et al. |
| 5,687,778 A | 11/1997 | Harris |
| 5,694,968 A | 12/1997 | Devall et al. |
| 5,755,248 A | 5/1998 | Szlaga et al. |
| 5,755,252 A | 5/1998 | Bergsma et al. |
| 5,762,090 A | 6/1998 | Halamish et al. |
| 5,960,816 A | 10/1999 | Mills et al. |
| 5,975,116 A | 11/1999 | Rosas et al. |
| 5,983,958 A | 11/1999 | Bergsma et al. |
| 5,996,607 A | 12/1999 | Bergsma et al. |
| 6,003,499 A | 12/1999 | Devall et al. |
| 6,026,848 A | 2/2000 | Huynh |
| 6,035,884 A | 3/2000 | King et al. |
| 6,058,963 A | 5/2000 | Enge et al. |
| 6,062,276 A | 5/2000 | Benjey et al. |
| 6,085,771 A | 7/2000 | Benjey et al. |
| 6,167,920 B1 | 1/2001 | Enge |
| 6,170,510 B1 | 1/2001 | King et al. |
| 6,189,567 B1 | 2/2001 | Foltz |
| 6,199,574 B1 | 3/2001 | Harris |
| 6,206,057 B1 | 3/2001 | Benjey et al. |
| 6,240,950 B1 | 6/2001 | Harris |
| 6,508,263 B1 | 1/2003 | Jahnke et al. |
| 6,516,835 B2 | 2/2003 | Enge |
| 6,546,954 B2 | 4/2003 | Sato et al. |
| 6,557,578 B2 | 5/2003 | Shimamura et al. |
| 6,561,211 B2 | 5/2003 | Devall |
| 6,564,822 B2 | 5/2003 | Muto et al. |
| 6,578,597 B2 | 6/2003 | Groom et al. |
| 6,591,855 B2 | 7/2003 | Nishi et al. |
| 6,601,617 B2 | 8/2003 | Enge |
| 6,612,324 B2 | 9/2003 | Szlaga |
| 6,634,341 B2 | 10/2003 | Cary et al. |
| 2002/0017281 A1 | 2/2002 | Crary et al. |
| 2003/0066558 A1 | 4/2003 | Muto et al. |
| 2003/0111111 A1 | 6/2003 | Zorine |
| 2003/0150492 A1 | 8/2003 | Sato |
| 2003/0189110 A1 | 10/2003 | Kurihara et al. |

FOREIGN PATENT DOCUMENTS

| | | |
|---|---|---|
| EP | 1325829 | 7/2003 |
| EP | 1332906 | 8/2003 |
| EP | 1007872 | 9/2003 |
| EP | 1200760 | 9/2003 |
| EP | 0823577 | 10/2003 |

FILL LIMIT VENT VALVE

FIELD OF THE INVENTION

This invention relates to a valve assembly for a fuel tank. More specifically, the invention is directed to a fill limit vent valve assembly that seals to prevent overfilling the fuel tank and reopens at a predetermined pressure to permit fuel tank venting.

BACKGROUND OF THE INVENTION

Modern vehicles require fuel management systems that control fuel vapor venting from a vehicle fuel tank to limit fuel filling and that control fuel tank ventilation to prevent overpressure and vacuum conditions in the fuel tank. Fuel vapor can be created in the fuel tank by temperature differences between the fuel tank and liquid fuel from a fuel pump, as well as by sloshing and agitation of the fuel tank during normal vehicle operation. The pressure buildup resulting from the creation of new fuel vapors must be relieved properly. For this reason, many fuel management systems are equipped with tank venting control assemblies capable of discharging a relatively large amount of fuel vapor in response to the development of high-pressure conditions in the fuel tank.

In addition to providing for adequate fuel vapor discharge from the fuel tank during high tank pressure conditions, well-designed tank pressure control assemblies must be capable of responding to a reduction of pressure in the fuel tank to or below a predetermined level. Introducing ambient air into the fuel tank to bring the fuel vapor pressure in the fuel tank back to approximately atmospheric pressure usually relieves these tank vacuum conditions.

In addition to controlling vapor escape, well-designed "On-Board Refueling Vapor Recovery" systems or (ORVR) systems assist in controlling the amount of liquid fuel that can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, an ORVR system is usually provided with a "fill-limit" control system, which assists in triggering the nozzle shut-off mechanism when the level of liquid fuel in the fuel tank has risen to a predetermined level.

Conventional valve assemblies designed to meet the foregoing requirements include pressure-relief, over-fill, and/or rollover components. Typically, the valve assemblies include a sealing element made of a plastic, hard rubber, or other elastomeric material. The conventional sealing element presses against a portion of the valve assembly under fuel vapor pressure, gravity, or the like in order to seal the valve assembly. Although undesirable, the sealing element is more often than not in contact with the valve assembly due to vehicle vibrations and fuel sloshing. Over time, the recurring sealing action and repeated exposure to vehicle vibrations and fuel tank pressures can flatten and wear down edges of an elastomeric sealing element. Moreover, that portion of the valve assembly contacted and sealed by the sealing element can prematurely deteriorate. For instance, the contacted portion of the conventional valve assembly will often develop an unwanted indentation due to the repeated contact with the sealing element.

Eventual deformation of the sealing element and the contacted portion of the valve assembly adversely affects the sealing capacity of the valve assembly. It will be appreciated, for instance, that impaired sealing can degrade the rollover function of the vehicle fuel system. Specifically, a deformed sealing element in a rollover situation can permit fuel to leak past an outlet of the valve assembly to a fuel vapor recovery canister or directly to the atmosphere external to the vehicle, which may create a fire or explosion hazard.

A fill-limit and tank ventilation control system is needed that vents fuel vapor from the vapor space in a fuel tank during early stages of refueling but blocks introduction of any and all liquid fuel in excess of a maximum volume so as to preserve a minimum volume of the vapor space in the fuel tank once the fuel tank is filled to its maximum capacity with fuel. Ideally, this fill-limit and tank ventilation control system could be included as one component in a comprehensive ORVR vehicle fuel system to manage fuel vapor recovery during all phases of vehicle use. One attempt to address this requirement is disclosed in U.S. patent application Ser. No. 10/260,722, filed Sep. 30, 2002, now U.S. Pat. No. 6,758,235. However, a relatively uncomplicated ORVR system design is needed in which the sealing elements are in a spaced-apart arrangement such that the sealing elements touch only during specific fuel conditions to prevent undesirable wear and tear on the sealing elements.

BRIEF SUMMARY OF THE INVENTION

The present invention provides a fill limit vent valve (FLVV) assembly for a fuel tank that selectively seals to prevent overfilling of a fuel tank and during a rollover condition to prevent leakage of fuel. Moreover, the FLVV assembly reopens at a predetermined pressure after filling the fuel tank to permit fuel tank venting. The component parts of the FLVV assembly are simple and economical to manufacture, assemble, and use. Other advantages of the invention will be apparent from the following description and the attached drawings, or can be learned through practice of the invention.

According to one aspect of the invention, a FLVV assembly is provided for attachment in an aperture of a fuel tank wall. The FLVV assembly includes a cover or a cap member, a valve housing, a first stage sealing mechanism (carrier stage), and a second stage sealing mechanism (float stage). The carrier and float stage sealing mechanisms are operably located in the valve housing.

In another aspect of the invention, a nozzle in a cap member of a FLVV assembly is non-linear. The circuitous nozzle provides additional protection against liquid fuel splash into a fuel vapor recovery device.

The FLVV assemblies of the various embodiments are generally subject to six valve assembly conditions. By way of example operation, in a first valve assembly condition the FLVV assembly permits substantially unrestricted fuel vapor venting from the fuel tank through the valve housing and the nozzle into the fuel vapor recovery device. During fuel filling, the FLVV assembly transitions to a second valve assembly condition marked by an initial sealing action of the sealing mechanisms.

At a normal rate of fueling, liquid fuel enters the valve housing in a third valve assembly condition and buoys the carrier and float stage sealing mechanisms in a direction of the cap member. In this third valve assembly condition, the valve assembly is sealed to prevent fuel vapor discharge.

In a fourth valve assembly condition, the float stage recedes from the carrier stage to permit increased fuel vapor discharge. However, the carrier stage continues to prevent unrestricted fuel vapor discharge.

According to its predetermined design, the carrier stage releases at a predetermined pressure in a fifth valve assembly condition to permit unrestricted fuel vapor discharge. In a sixth valve assembly condition, the FLVV assembly transitions to a resting position and returns to the first valve assembly condition.

Other aspects and advantages of the invention will be apparent from the following description and the attached drawings, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE DRAWINGS

Figure 1:
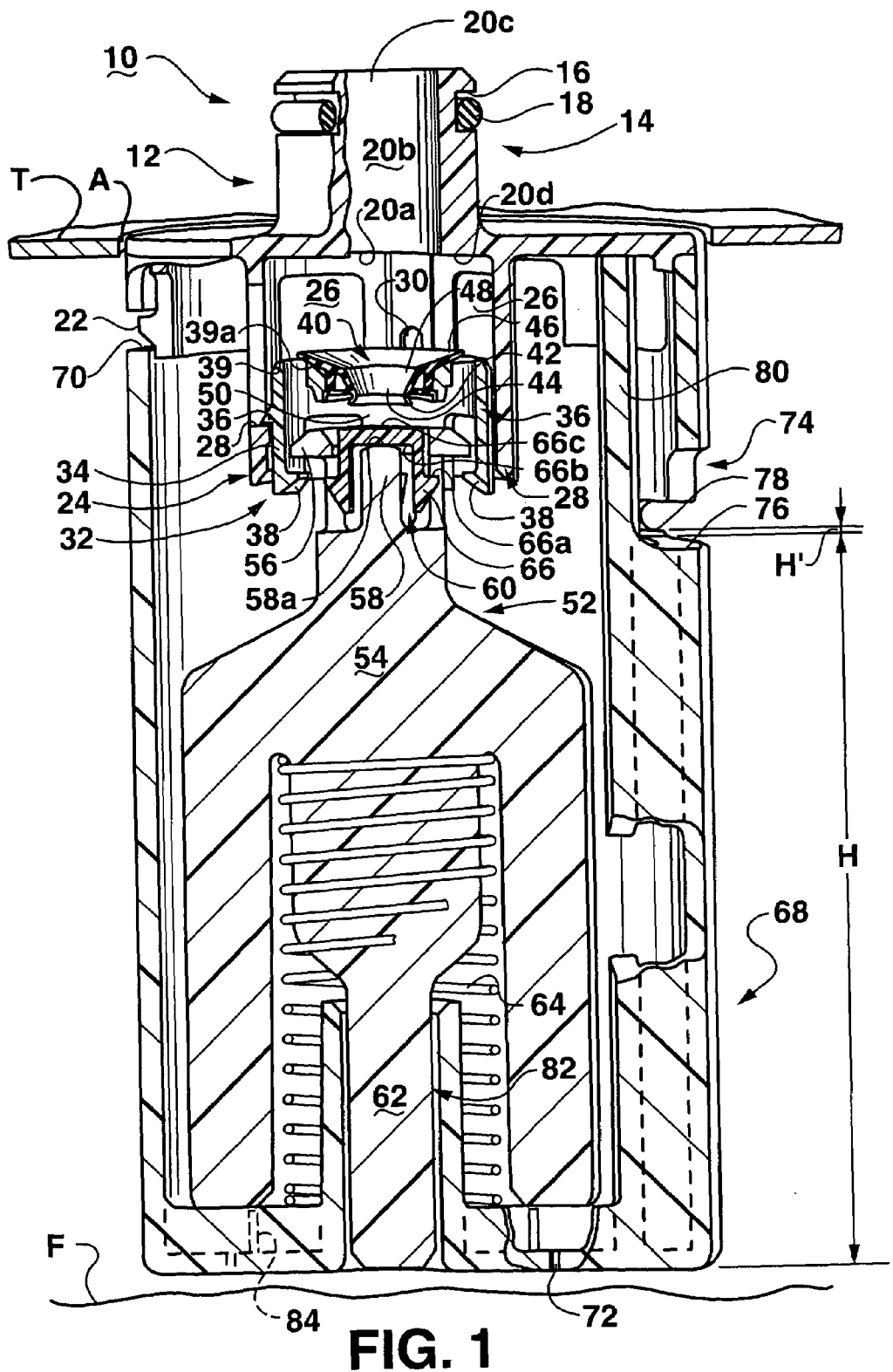
FIG. 1 is an elevational view of a cross section of a fill limit vent valve for a vehicle fuel tank according to one embodiment of the invention in which a first valve assembly condition permits substantially unrestricted fuel vapor venting.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in the Figures, a fill limit vent valve (FLVV) assembly or apparatus is provided to limit fuel overfilling of a fuel tank by an operator and to control ventilation of the fuel tank in response to overpressure and vacuum conditions within the fuel tank. The FLVV assembly generally includes a vent module having a two-stage sealing mechanism operably disposed in a valve housing. The components of the FLVV assembly, described in detail below, and their placement and dimensions are modifiable to accommodate various fuel tank sizes and manufacturing requirements and are not limited to only those examples shown in the Figures.

A first embodiment of the FLVV assembly, designated by the number 10, is shown in FIGS. 1–7. In general the FLVV assembly 10 includes a cover or cap member 12, a carrier stage 32, a float stage 52, and a valve housing 68. By way of brief introduction, to assemble the FLVV assembly 10 the carrier and float stages 32, 52 are slid together axially, and the carrier stage 32 is connected axially to the cap member 12. The float stage 52 is inserted in the valve housing 68, which is connected to the cap member 12 to operably hold the carrier and float stages 32, 52 therein. In this aspect of the invention, the FLVV assembly 10 is flange-mounted (partially shown) in a wall aperture A of a fuel tank T by ultrasonic welding, rivets, heat-stakes, snaps, screws or other suitable mounting arrangements according to manufacturing requirements. When mounted, at least a portion of the valve housing 68 is disposed in an interior of the fuel tank T. Further details of these components, their interconnections, and examples of their operation are provided below.

With particular reference to FIG. 1, the cap member 12 is made of high-density polyethelene (HDPE), nylon, POM (polyoxymethylene; i.e., acetal plastic), PEEK (polyeretherketone), or any material suitable for attachment to the fuel tank T. The cap member 12 includes a neck or nozzle 14 for connection to an external destination such as a fuel vapor recovery device (not shown). The nozzle 14 defines an annular recess 16 in which an o-ring 18 is seated to prevent fuel vapor penetration from about the nozzle 14 to the fuel vapor recovery device. As known, the o-ring 18 can also be a gasket, an elastomeric seal, a sealant such as glue or an adhesive, and various combinations of these elements. Further detail need not be given to appreciate or practice this aspect of the invention.

Also shown in FIG. 1, the nozzle 14 of the cap member 12 defines a vapor inlet opening 20a, a passageway 20b, and a vapor outlet opening 20c. The passageway 20b interconnects the vapor inlet opening 20a and the vapor outlet opening 20c to provide passage of fuel vapor from the interior of the fuel tank T. An area 20d located near the vapor inlet opening 20a is sealable by an elastomeric sealing element 40, described below, to prevent the fuel vapor passage.

FIG. 1 further shows that the cap member 12 includes one or more retaining projections 22 that are snap-connectable to one or more receptacles 70 of the valve housing 68. The retaining projections 22 are made to flex relative to the valve housing 68 during connection of the cap member 12 with the valve housing 68. Once the retaining projections 22 are snapped in the receptacles 70, the retaining projections 22 return to their original form to hold the cap member 12 and the valve housing 68 together. It will be appreciated that the retaining projections 22 and receptacles 70 can be reversed or repositioned on the cap member 12 and the valve housing 68. Moreover, sizes and shapes of the retaining projections 22 and the receptacles 70 can be modified according to various manufacturing requirements. Such modifications need not be further described for one skilled in the art to understand and practice this aspect of the invention.

Figure 2A:
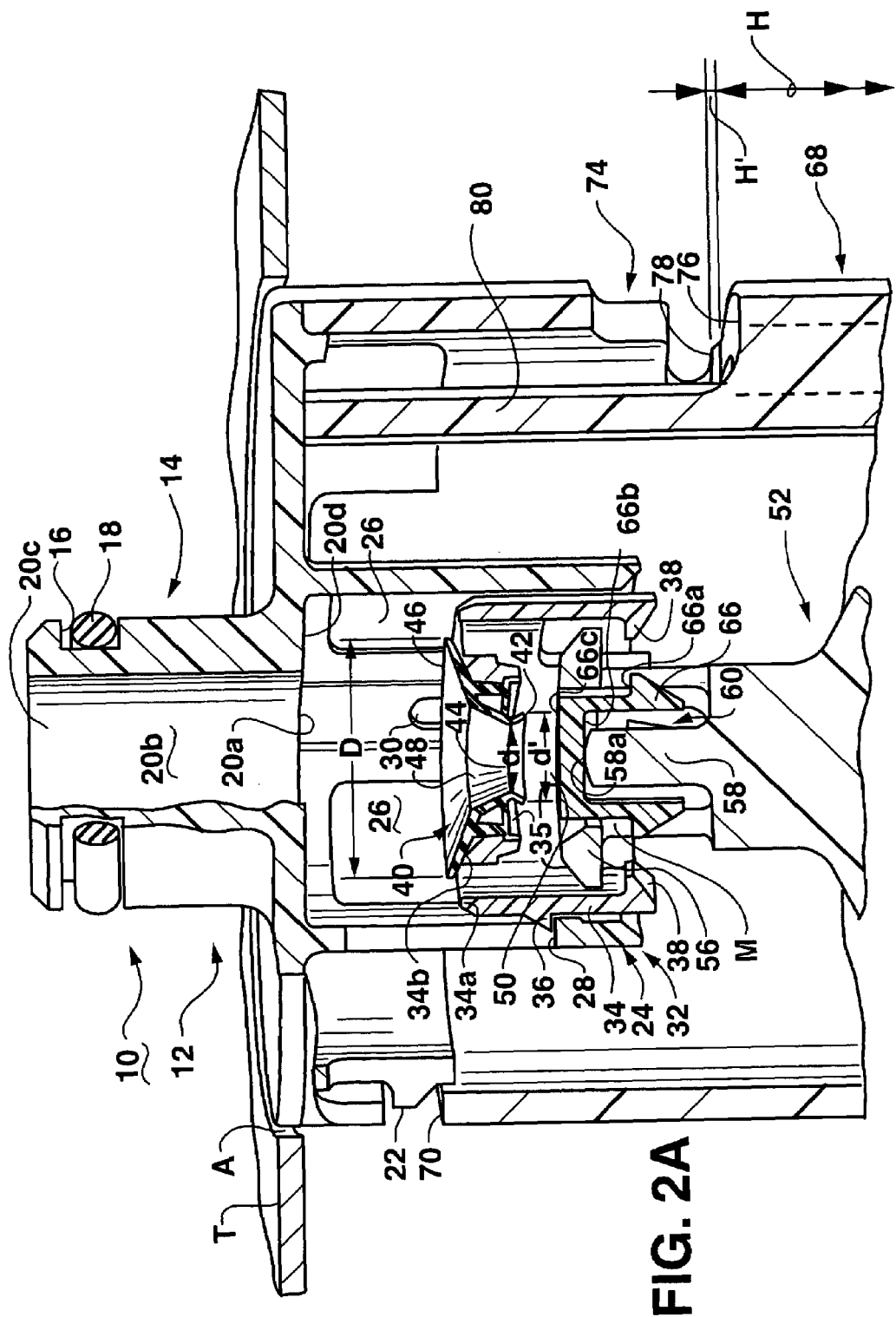
FIG. 2a is an enlarged view of a portion of the fill limit vent valve as in FIG. 1.

As shown in FIGS. 1 and 2a, the cap member 12 further defines a guidance cage 24, which acts as a guide for a carrier 34 and a float 54. The cage 24 includes one or more notches 30 that allow the cage 24 to flex temporarily for axial insertion of the carrier 34. It is to be noted that a circumference of the cage 24 in a non-flexed state and a circumference of a guide channel 82 (described below) in the valve housing 68 are designed to accommodate fuel swell tolerances of the components. For example, as the materials of the carrier 34 and the float 54 swell due to heat and pressure during normal vehicle operations and weather conditions, the cage 24 and the guide channel 82 are configured to allow free axial movement of these moving components.

As further shown in FIGS. 1 and 2a, one or more vent windows 26 are sized and positioned about the cage 24 to permit fuel vapor venting from the valve housing 68 through the nozzle 14. The exemplary vent windows 26 remove as much as 50% of a top ⅔ portion of the cage 24 to provide a specific fuel vapor-venting requirement. Without requiring further description, the vent windows 26 can be positioned and sized by one skilled in the art to address various fuel vapor venting requirements.

The cage 24 further includes a plurality of notches or an annular ledge 28 to catch and support a plurality of first projections 36 depending from the carrier 34. The projections 36 of the carrier 34 are arranged to catch on the ledge 28 in a first valve assembly condition (unrestricted fuel vapor venting) to limit downward travel of the carrier 34 according to an exemplary operation below.

Figure 2B:
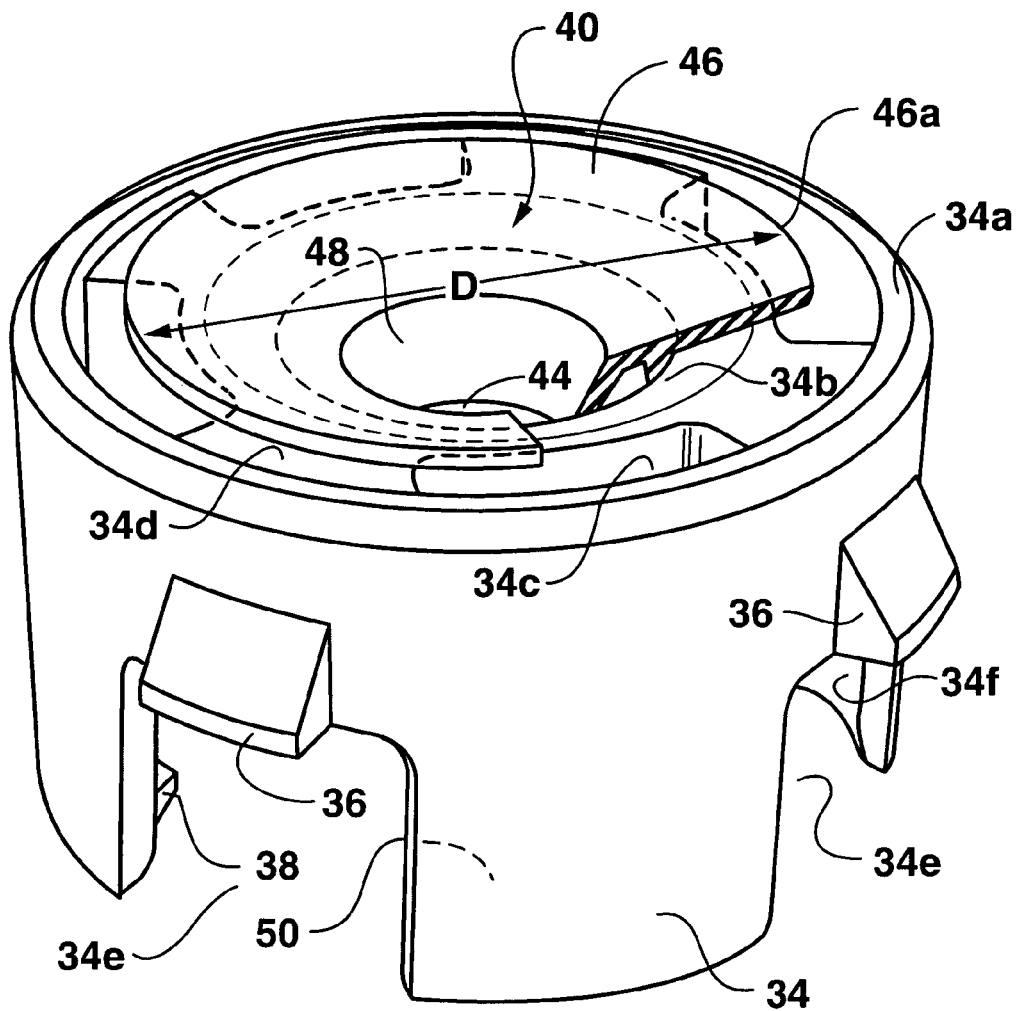
FIG. 2b is a partial detailed view of a carrier stage of the fill limit vent valve as in FIG. 1.

FIGS. 1, 2a and 2b show the carrier stage 32, which as briefly introduced includes the carrier 34 carrying the sealing element 40. The sealing element 40 is mechanically attached or overmolded to the carrier 34. The carrier 34 is movably disposed in the cage 23 and thus guides the sealing element 40 via the cage 24 to restrict or inhibit fuel vapor venting from the FLVV assembly 10 according to various valve conditions described below.

As shown most clearly in FIG. 2b, the carrier 34 is formed to include a circumferential edge or mechanical stop 34a, a seal seat 34b, a plurality of carrier openings 34c, a plurality of ramps 34d, and a plurality of recesses 34e. As this perspective shows, the funnel-shaped, seal seat 34b angles downwardly and inwardly from a vicinity of the carrier openings 34c and terminates near the orifice 48. The seal seat 34b defines an opening (not shown) complementary to the orifice 48 to cradle the sealing element 40, which is overmolded in this example. Due to the angled formations of the funnel-shaped seal seat 34b, the ramps 34d, and the sealing element 40, any pooling of liquid fuel or condensation of fuel vapor on the sealing element 40 is urged downwardly on the sealing element 40 through the orifices 44, 48 into the cavity 84. Thus, liquid fuel or fuel vapor condensation does not affect the sealing function of the sealing element 40 against the area 20d as described in operation below.

As shown in FIG. 2b, the inwardly sloping ramps 34d assist the seal seat 34b in support of the sealing element 40. The ramps 34d result from the formation of the carrier openings 34c. Although the carrier openings 34c permit some fuel vapor flow in the first valve assembly condition, the carrier openings 34c more specifically facilitate molding one or more second projections 38 without having to undercut the carrier 34 to form the second projections 38. In other words, if a top area of the carrier 34 were solidly formed (i.e., no carrier openings 34c), the second projections 38 would have to be formed subsequently by undercutting the carrier 34. It will be appreciated that such an additional undercutting step complicates manufacturing processes.

As FIGS. 2a and 2b further show, the mechanical stop 34a is spaced vertically apart from the projections 36. In the first valve assembly condition, the mechanical stop 34a is also spaced apart from the area 20d of the nozzle 14. However, in a third valve assembly condition, the mechanical stop 34a limits upward movement of the carrier stage 32 by the float stage 52 as described further with respect to FIG. 4 below.

The sealing element 40 in FIGS. 2a and 2b defines a first seal 42 that has a first small orifice 44 and a second seal 46 with a second larger orifice 48. An acting diameter d' proximate the orifice 44 is about 1 to 5 millimeters (mm), more particularly about 3 mm in diameter. A flow control diameter d controls pressure "decay". The second larger orifice 48 opens to an outer diameter D of about 12 mm to about 18 mm, more particularly about 15 mm. As discussed in greater detail below, reopening of the FLVV assembly 10 is a function of the acting diameter d', which is approximately ⅓ of the outer diameter D. Thus, in this embodiment reopening of occurs at a "lower" higher pressure than previously possible, which helps prevent fuel tank deformation and prolongs a service life of the sealing element 40.

Also shown in detail in FIG. 2b, the second seal 46 defines a circumferential lip 46a disposed about the second larger orifice 48. The circumferential lip 46a is preferably beveled or chamfered to provide a greater surface area to seal against the area 20d. In contrast, a sharply angled or raised lip of a typical seal would contact the area 20d substantially at a right angle, which reduces a contact area of the typical seal available to seal against the area 20d. Further, an angled seal is flexibly predisposed to facilitate sealing. Thus, the beveled circumferential lip 46a will provide a reliable, efficient seal about the area 20d in excess of 1.5 million cycles of the sealing element 40, which reduces maintenance and repair costs of the FLVV assembly 10.

FIG. 2a shows most clearly a gap 50 formed between the first seal 42 and a top of the float stage 52. More particularly, the gap 50 is formed between the first seal 42 and a second contact surface 66c of the pivot pin 66. The gap 50 measures between about 1 mm to about 4 mm to prevent the second contact surface 66c and the first seal 42 from touching in the first valve condition. In other words, the gap 50 is usually only closed by the pivot pin 66 after refueling to prevent unnecessary wear and tear on the components. A shoulder 35 is provided to prevent bending of the seal 42 past about horizontal by the second contact surface 66c. In other words, the shoulder 35 limits angular compression of the seal 42 such that the seal 42 cannot "sandwich" against itself and cause unwanted adhesion to itself. As noted above, the exemplary sealing element 40 has tested in excess of 1.5 million cycles due to this aspect of the design.

With further reference to FIGS. 1, 2a and 2b, the float 54 of the float stage 52 defines a circumferential ring 56. The ring 56 projects radially outward to catch on the radially inward projecting second projections 38 of the carrier 34 such that the carrier 34 guides the float 54 between the second and a sixth valve assembly condition, particularly catching the float 54 during the fifth valve assembly condition. This arrangement contributes to reopening the FLVV assembly 10 as discussed below with respect to FIG. 6.

The float 54 further defines a stem 58 that in conjunction with the ring 56 moveably retains the pivot pin 66. The stem 58 defines a dome-shaped or rounded point-bearing surface 58a on which the pivot pin 66 tiltably rides. A gap 60 is defined between the ring 56 and the stem 58. As described in operation below, the stem 58 and the gap 60 permit the pivot pin 66 a limited range of motion to assist in aligning the pivot pin 66 and the first seal 42.

The float 54 also includes a float guide 62, which is guided by the guide channel 82 in the valve housing 68 during displacement of the float 54. As noted above, the cage 24 and the guide channel 82 cooperate to permit stable guidance of the float 54. In this aspect, the float guide 62 and the guide channel 82 are of sufficient length that the float 54 is laterally stable in the valve housing 68 during all valve conditions. It will be appreciated that the guide channel 82 can be multiple guide channels disposed in the valve housing 68 in which a respective number of float guides depending from the float 54 are guided. Further details of these components are not necessary to appreciate and practice this aspect of the invention.

FIG. 1 also shows a spring element 64 disposed about the float guide 62 of the float 54. The spring element 64 has a spring constant designed to urge the float 54 in a direction of the nozzle 14 by a liquid fuel F' (see e.g., FIG. 4). In one aspect, the float 54 is glass bubble-filled at 900 kg/m$^3$, which provides a larger float volume for the float 54, and therefore greater buoyancy in conjunction with the spring element 64. Further details need not be given to appreciate and practice this aspect of the invention.

With further reference to the pivot pin 66 as shown in FIG. 2a, one or more pin catches 66a project radially from the pivot pin 66 in a direction of the stem 58. The pin catches 66a are configured to catch on the ring 56 of the float 54 (see, e.g., FIG. 5). Thus, the pivot pin 66 is adjustably held in place relative to the float 54 during all valve conditions.

The pivot pin 66 further defines a first contact surface 66b that is substantially flat in this example. As noted above, the first contact surface 66b tiltably rides on the domed stem surface 58a bounded by the stem 58 and the gap 60. In operation, the first contact surface 66b tiltably aligns the pivot pin 66 relative to the first seal 42, and the second contact surface 66c seals against the first seal 42. Due to cooperation of the point-bearing stem surface 58a and the relatively flat first contact surface 66b, alignment and sealing of the second contact surface 66c against the first seal 42 occurs regardless of vehicle or FLVV assembly 10 orientations.

Also shown in FIG. 2a, the ring 56 and the pivot pin 66 are designed to travel axially relative to each other a distance M of about 1 mm to about 3 mm, preferably 1.8 mm. This distance M contributes to the periodic, temporary formation of a pressure chamber 39 within the carrier 34 in a fourth valve assembly condition as described below with respect to FIG. 5. As will be seen, the distance M corresponds to a volume to which the chamber 39 can expand to reduce a pressure differential between the chamber 39 and an external atmosphere. As operatively described below, this reduction improves reopening performance of the FLVV assembly 10.

The valve housing 68 shown in FIG. 1 is made of POM, nylon, PEEK, and other materials suitable for substantially constant contact with liquid fuel and fuel vapor. The valve housing 68 includes one or more pinholes or drainage holes 72. The holes 72 are located apart from the cap member 12 and spaced circumferentially about the guide channel 82 of the valve housing 68. The holes 72 are designed to control entry and drainage of a liquid fuel F' in an interior or cavity 84 of the valve housing 68. By permitting slow drainage of the fuel F' from the cavity 84, the holes 72 reduce the dynamic movement of the float 54 during vehicle maneuvers, thus preventing liquid fuel carryover into the nozzle 14 at a high liquid level. As shown, one or more ribs 84 may be formed depending from the float 54 and/or the valve housing 68. According to manufacturing requirements, these ribs 84 can be molded in various shapes and sizes to prevent the float 54 from corking the holes 72.

Figure 3:
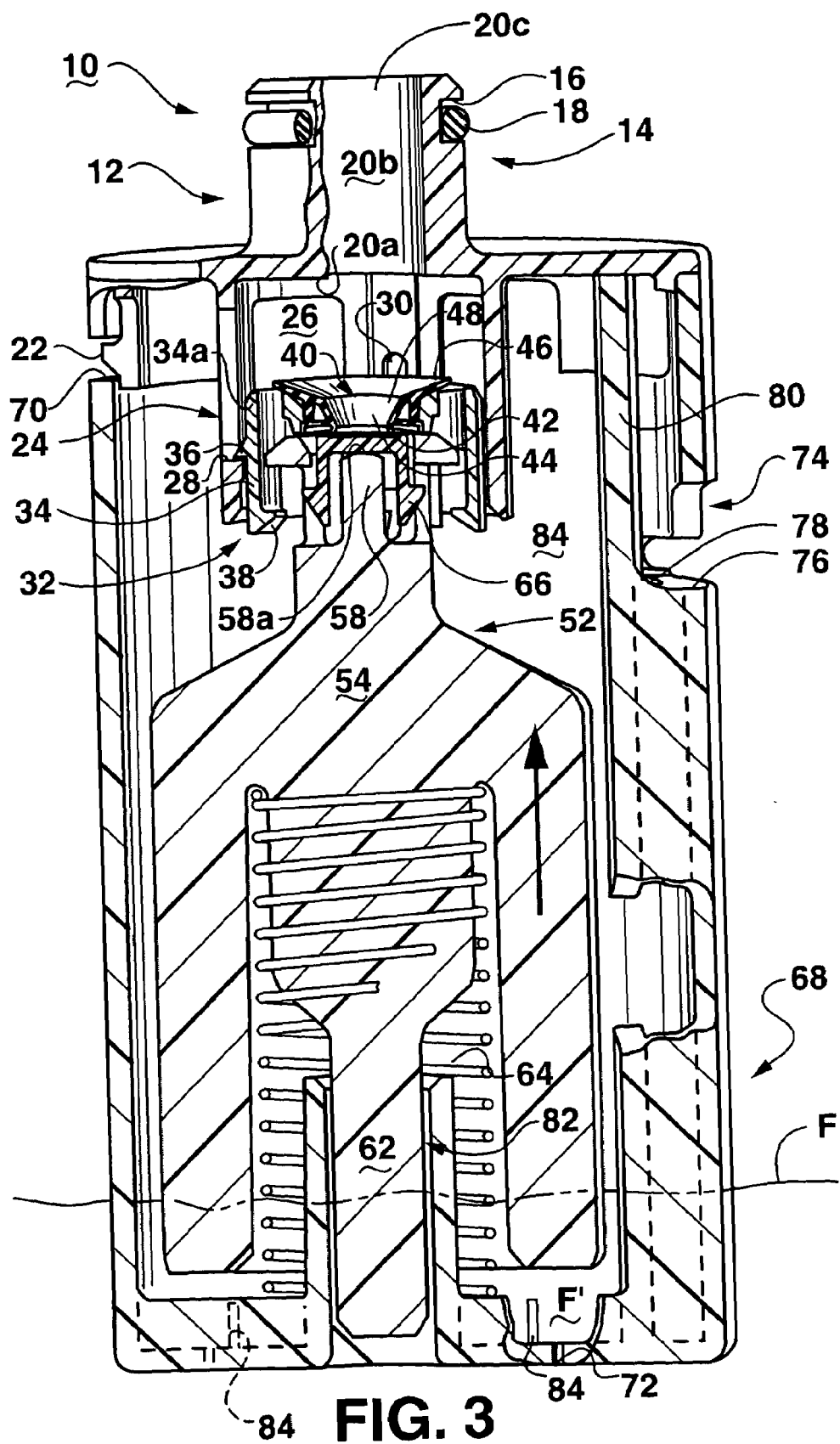
FIG. 3 is an elevational view of a cross section of the fill limit vent valve as in FIG. 1 showing a second valve assembly condition in which the fuel vapor venting is reduced.

Under normal refueling conditions, the holes 72 allow the float 54 as well as the internal liquid fuel F' in the cavity 84 and a fuel F external to the valve housing 68 to rise substantially equally or at an even rate (see, e.g., FIG. 3). On the other hand, if refueling exceeds a normal rate, the holes 72 will not be able to allow the liquid fuel F' into the cavity 84 at the same rate as the fuel F rises external to the valve housing 68 before fuel F' reaches a vent window 74 of the valve housing 68. Thus, the fuel F will enter through the vent window 74, raise the float 54 relatively faster than under normal refueling conditions, and cause fuel filling to shutoff more quickly.

As shown in FIGS. 1 and 2a, the vent window 74 has a fuel entry edge 76 that is positioned at a height H measured from near the holes 72. Fuel entry is a function of the placement of the fuel entry edge 76. In other words, the height H determines when liquid fuel F enters the window 74 to act upon the carrier and float stages 32,52 to shut off fuel filling.

The fuel window 74 also includes a shutoff edge 78. The shutoff edge 78 is spaced vertically apart from the fuel entry edge 76 at a height H' about 1 mm to about 4 mm above height H in a direction of the cap member 12. Optimally, once the fuel F reaches the shutoff edge 78 of the fuel window 74, fuel filling will shut off within +/−3 mm, and preferably no later than at about a time the fuel F reaches the shutoff edge 78.

The valve housing 68 in FIG. 1 further includes a wall or splashguard 80, which is located in proximity to the window 74 to provide further protection against liquid fuel splash as the liquid fuel F enters the window 74. It should be noted that the guard 80 can be made to extend the entire length of the valve housing 68, or the guard 80 can terminate at a point below the fuel window 74 to achieve approximately the same effect. It will also be appreciated that the guard 80 can be formed as part of the cap member 12 in lieu of or in addition to as part of the valve housing 68.

The fuel shutoff edge 78 introduced above also acts as an inspection window to view the carrier and float stages 32,52 in the cavity 84 behind the guard 80. The guard 80 is sufficiently wide to guard against substantial liquid fuel splash as described above, but still allows inspection of the carrier and float stages 32,52. Moreover, the window 74 can be directed opposite of an inlet check valve (not shown) of the fuel tank T to avoid direct fuel splash on the carrier and float stages 32,52 during refueling in order to guard against premature shutoff due to insufficient venting.

The invention may be better understood with reference to an exemplary operation as shown in FIGS. 1–7. FIGS. 1 and 2a show the first valve assembly condition, which provides for unrestricted fuel vapor venting from the interior of the fuel tank T through the valve assembly 10 exiting through the outlet 20c of the nozzle 14. In this first valve assembly condition, fuel vapor enters through the holes 72, the window 74, the vent windows 26, in and around the gap 60 and the carrier stage 32 including the carrier openings 39b and the orifices 44,48 and exits into the nozzle 14. The first and second seals 42, 46 are not in contact with other components such as the area 20d and the pivot pin contact surface 66c in this first valve assembly condition. This disengaged arrangement advantageously reduces wear and tear on the seating components.

FIG. 3 shows the second valve assembly condition. Under normal refilling conditions as shown in FIG. 3, the liquid fuel F' enters the holes 72 and acts upon the float stage 52 including the float 54. After sufficient liquid fuel F' has entered the holes 72 into the cavity 84 of the valve housing 68, the float 54 buoys in a direction toward the first seal 42 of the carrier stage 32. Notwithstanding a vehicle parking angle for instance, the pivot pin 66 adjustably tilts on the rounded stem surface 58a such that the second contact surface 66c seals against the first seal 42 and closes the small orifice 44. In this second valve assembly condition, fuel vapor venting continues substantially unabated, for instance, through the vent windows 26 into the vapor inlet opening 20a of the nozzle 14.

Figure 4:
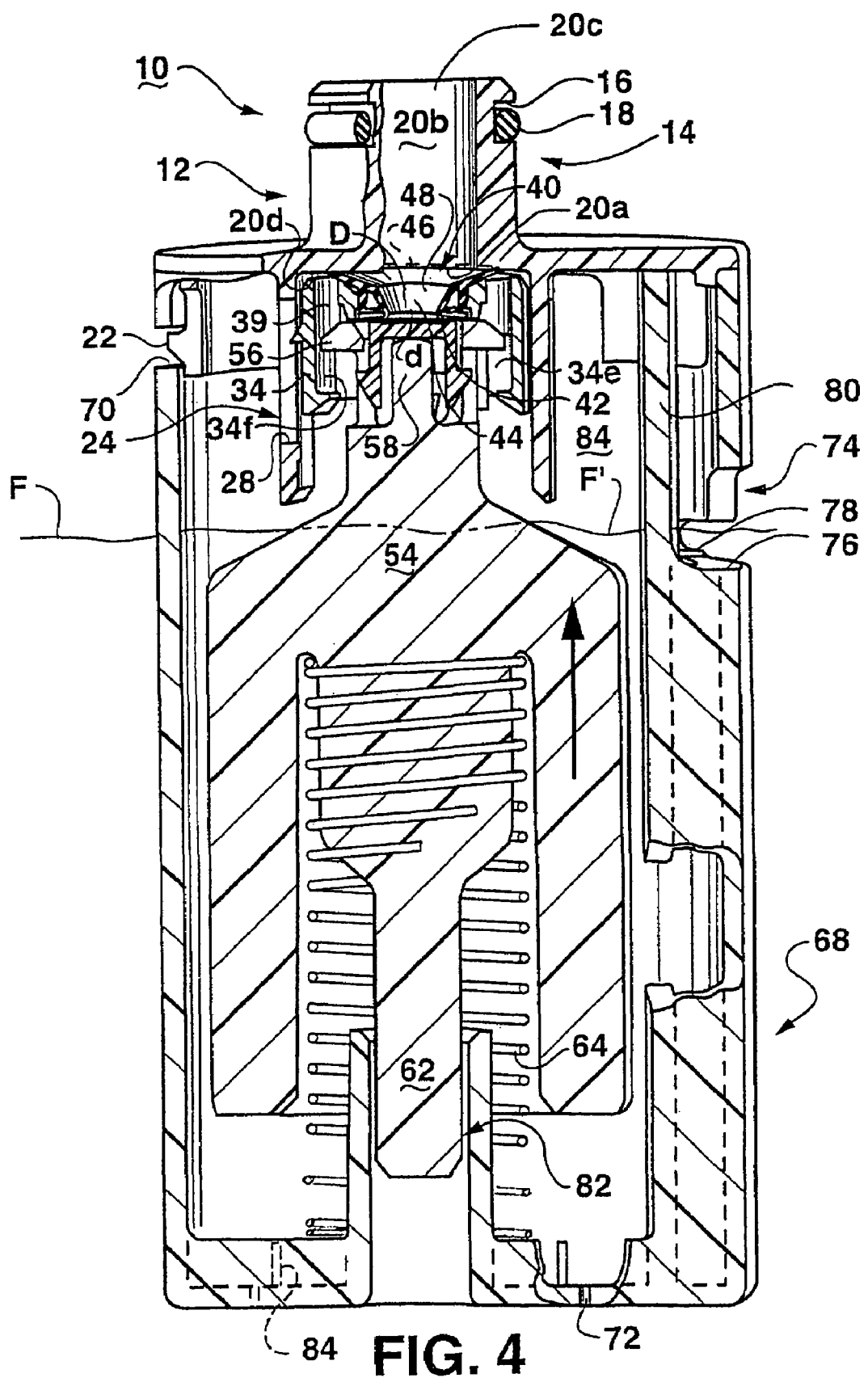
FIG. 4 is a view similar to FIG. 3 showing a third valve assembly condition in which the fuel vapor venting is prevented.

FIG. 4 shows the third valve assembly condition in which no fuel vapor venting occurs. As shown, the liquid fuel F' in the cavity 84 of the housing 68 and the liquid fuel F external the housing 68 have risen substantially equally until the fuel F has entered the fuel window 74 via the fuel entry edge 76. The fuel F thus spills over the fuel entry edge 76 to join with the fuel F' in the cavity 84 and buoy the float 54 along with the carrier stage 32 in the direction of the nozzle 14. As FIG. 4 shows, the vent windows 26 are closed by the carrier stage 32 as the carrier 34 slidably bypasses the vent windows 26. Also shown, the second seal 46 and its circumferential lip 46a seal about the area 20d. Accordingly, the inlet 20a is sealed and a pressure in the fuel tank T increases to cause a fuel pump nozzle (not shown) to shut off further fuel filling due to an increased pressure differential between an atmosphere external to the vehicle and the interior of the fuel tank T.

Figure 5:
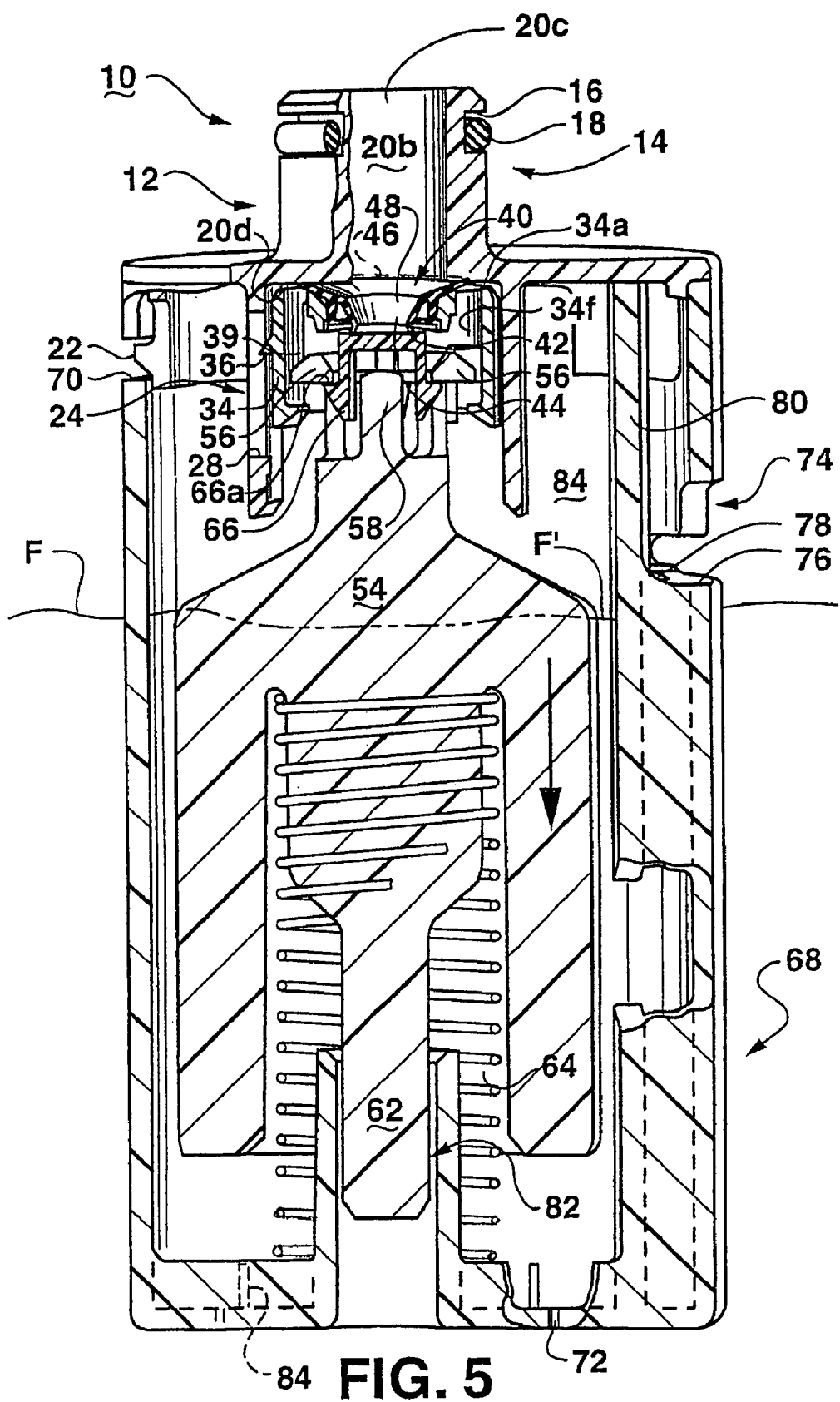
FIG. 5 is a view similar to FIG. 4 showing a first stage of reopening beginning in a fourth valve assembly condition.

FIG. 5 shows the fourth valve assembly condition beginning a reopening stage of the FLVV assembly 10. In this example, the float 54 of the float stage 52 begins to settle in accordance with its pre-selected buoyancy and a level of the fuel F'. The ring 56 of the float 54 therefore comes to rest on the pin catches 66a of the pivot pin 66 in this fourth valve assembly condition.

As introduced above, the pivot pin 66 and the ring 56 cooperate to create a lower pressure in that part of the cavity 84 above the ledge 28 of the cage 24. More specifically, the ring 56 slidably contacts an inner surface 34f of the carrier 34 to periodically, temporarily form the pressure chamber 39 in the carrier 34 in the third and fourth valve assembly conditions. In these third and fourth fuel valve assembly conditions, the temporary pressure chamber 39 develops a pressure of about 0.5 to about 0.95 of the pressure in the fuel tank T. Thus, for example, when the fuel tank T is at about 9.5–11.5 kilopascals (kPa), the pressure chamber 39 is at about 5–11 kPa, more particularly 8 kPa. Comparatively, an atmosphere above the nozzle 14 is at about 0 kPa. Therefore, reopening of the float stage 52 is based in part on a pressure differential of about 8 kPa in the chamber 39 and 0 kPa in the atmosphere instead of a greater, typical differential of 0 kPa and 10 kPa between the respective atmosphere and fuel tank.

Figure 6:
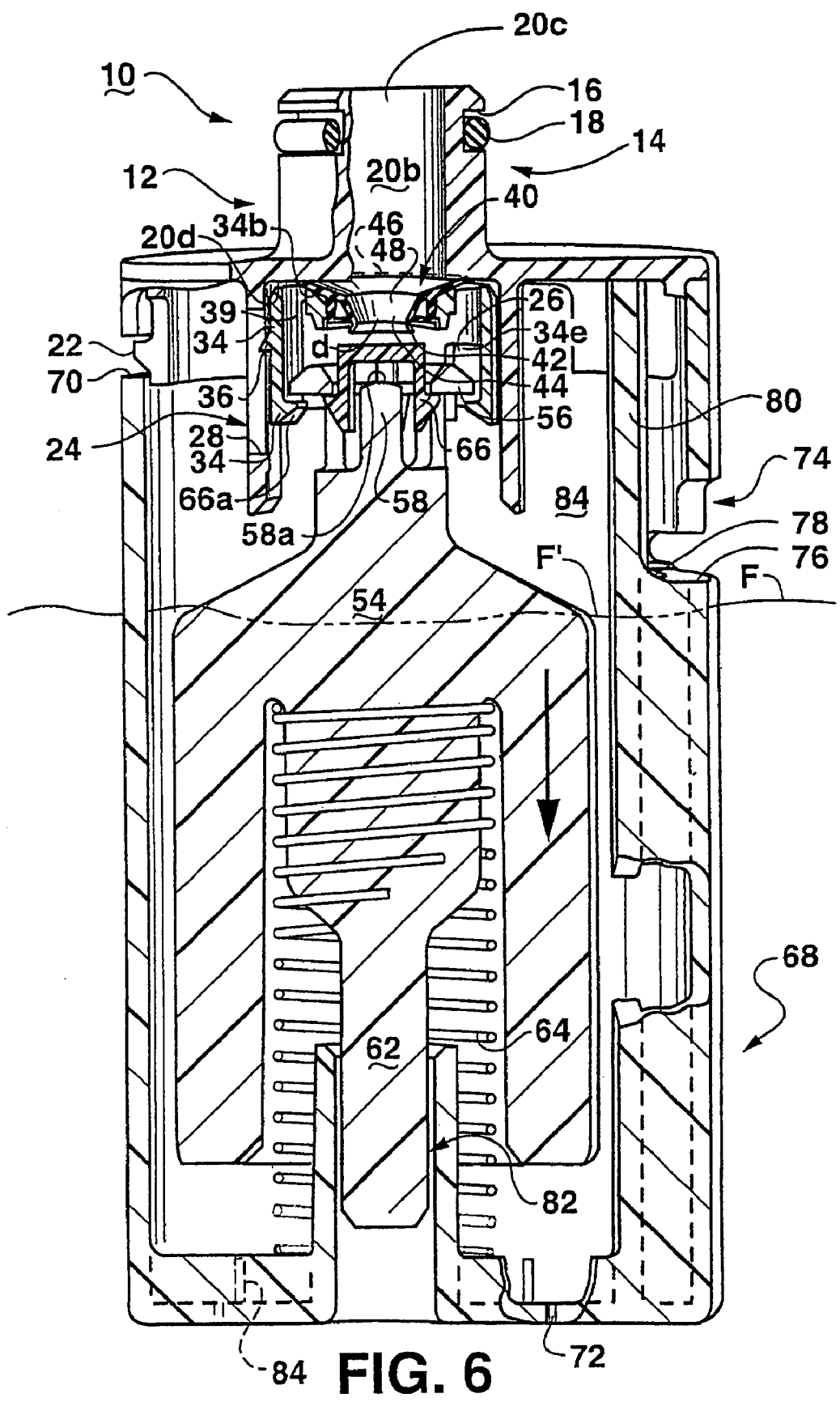
FIG. 6 is a view similar to FIG. 5 showing the first stage of reopening in a fifth valve assembly condition.

FIG. 6 shows the float stage 52 including the pivot pin 66 released from the first seal 42 in the fifth valve assembly condition. Release of the float stage 52 is determined in part by the flow control diameter d, which dictates the rate of pressure decay. For example, the float stage 52 releases from the small orifice 44 at about 2 kPa if the diameter d is about 3.3 mm and a differential pressure is about 8 kPa in the chamber 39 and about 0 kPa in the atmosphere (see FIG. 4).

Thus, the float stage 52 and pivot pin 66 will reopen from about the first seal 42 when the 8 kPa pressure in the chamber 39 "decays" to between about 1 kPa to about 3 kPa as the pressure equalizes with the external atmosphere. It will be appreciated that the diameter d can be modified to adjust the differential pressure in order to have the pivot pin 66 open sooner (smaller differential pressure) or later (greater differential pressure). For instance, assuming a constant volume of the chamber 39, if the diameter d is increased, pressure decay will occur faster to reopen the float stage 52 from about the first seal 42 more quickly. In comparison, the carrier stage 32 reopens from about the inlet 20a at a greater pressure differential of about 14–18 kPa due in part to the larger diameter D of the orifice 48, which is described with respect to FIG. 7 below.

With further reference to FIG. 6, release of the pivot pin 66 occurs at a pressure differential of between about 1 kPa to about 3 kPa in the fifth valve assembly condition due in part to the diameter d, and the circumferential lip 46a, and the orifice 48. However, release of the pivot pin 66 is also based in part on the volume of the temporary pressure chamber 39. The volume of the chamber 39, as noted with respect to FIG. 2, is a function of the distance M between the pin catches 66a and the ring 56. If, for example, the distance M were increased (e.g., if the ring 56 were made to travel a greater axial distance), then the volume of the chamber 39 would be greater, and the pivot pin 66 would release sooner, assuming a constant diameter d. In this example, it would take less time to equalize the larger volume of the chamber 39 with the external atmosphere. This activity is governed of course by Boyle's law, which states that volume is inversely proportional to the pressure, and vice versa. In other words, assuming a constant temperature (T), a pressure (P) is inversely proportional to a volume (V) of a definite amount of gas (k), where k is a constant value if the gas is behaving as an ideal gas. Mathematically, $PV=k$, or $P_1V_1=P_2V_2$.

Figure 7:
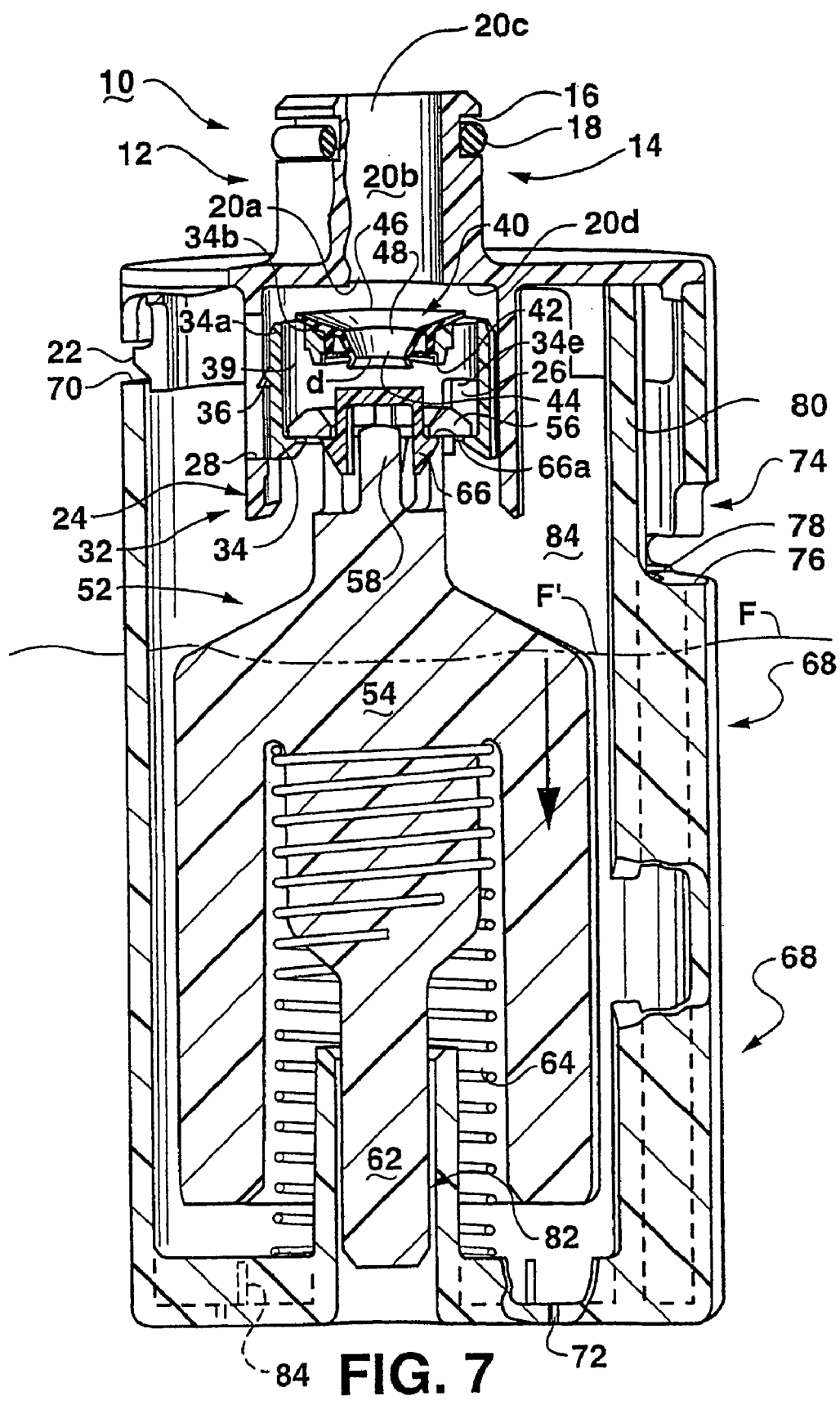
FIG. 7 is a view similar to FIG. 6 showing a second stage of reopening in a sixth valve assembly condition.

FIG. 7 shows the FLVV 10 transitioning in the sixth valve assembly condition as it returns to the first valve assembly condition for unrestricted fuel vapor venting. As shown, the second seal 46 of the carrier stage 32 has released from about the area 20d near the nozzle 14 at between about 14 kPa to about 18 kPa. More specifically, when the float stage 52 released as described above in FIG. 6, the recesses 34e at least partially opened the windows 26. Once the windows 26 were again in vapor communication with the chamber 39, the pressure in the chamber 39 increased to a higher interim pressure equal to about the internal pressure of the fuel tank T of approximately 10 kPa. As the interim pressure of about 10 kPa in the chamber 39 decays toward 0 kPa, the larger orifice 48 will re-open the carrier stage 32 faster; i.e., at about 14 kPa rather than about 8 kPa in the reopening case of the smaller orifice 44. In other words, the larger diameter D of the large orifice 48 causes the carrier stage 32 to re-open at a greater pressure differential of about 14–18 kPa relative to the atmosphere of about 0 kPa. It will again be appreciated that the diameter D can be modified to adjust the differential pressure in order to have the carrier stage 32 open sooner (smaller differential pressure) or later (greater differential pressure) according to manufacturing requirements.

Figure 8:
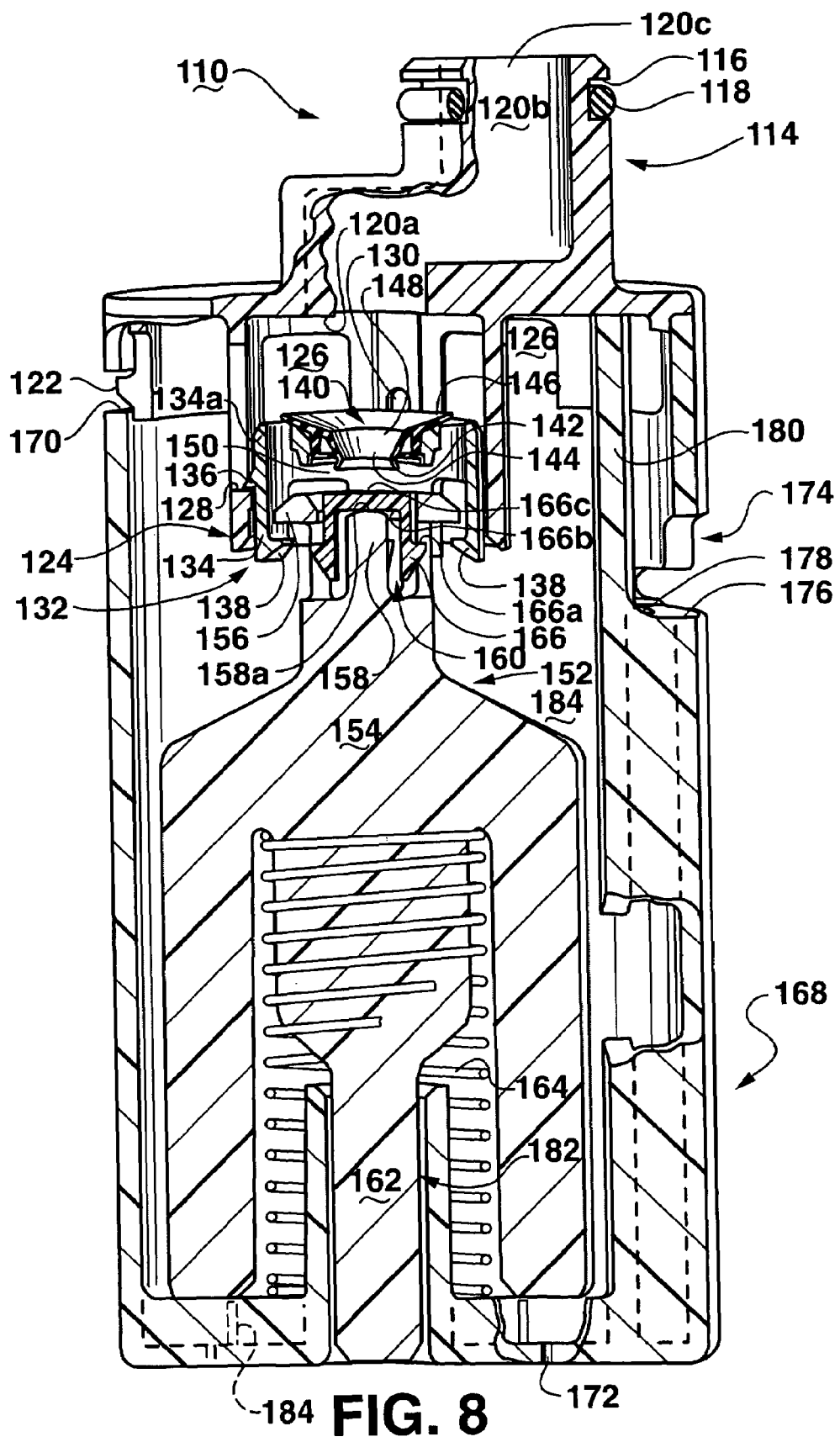
FIG. 8 is an elevational view of a cross section of a fill limit vent valve according to an alternate embodiment of the invention.

In another embodiment of the invention shown in FIG. 8, a fill limit vent valve (FLVV) assembly 110 is provided. This FLVV assembly 110 is similar in many ways to the embodiment described above. Therefore, only major differences are described below for the sake of brevity.

As shown in FIG. 8, the valve assembly 110 generally includes a cap member 120, a carrier stage 132, a float stage 152, and a valve housing 168. The carrier stage 132 and the float stage 152 are operably disposed in the valve housing 168 similar to the arrangement described above for the FLVV assembly 10. In one respect, the FLVV assembly 110 differs from the first embodiment in that a nozzle 140 of the cap member 120 is offset from a float 154 of the float stage 152 according to FIG. 8. As shown, a passageway 120b of the nozzle 140 is circuitously formed. Thus, since the nozzle 140 and the float 154 are offset from each other and not axially aligned, this embodiment further guards against liquid fuel splash entering a window 174 of the valve housing 168, bypassing a guard 180, and allowing the liquid fuel F' into a fuel vapor recovery device (not shown) via an outlet 120c of the nozzle 140. To provide a full and enabling disclosure of the valve assembly 110, reference is made to similar or like elements and operations of the first embodiment.

While preferred embodiments of the invention have been shown and described, those skilled in the art will recognize that other changes and modifications may be made to the foregoing embodiments without departing from the scope and spirit of the invention. For example, specific pressures and dimensions are set forth for current applications and industry regulations and specific shapes of various elements of the illustrated embodiments may be altered to suit particular applications. It is intended to claim all such changes and modifications as fall within the scope of the appended claims and their equivalents. Moreover, references herein to "top," "lower," "bottom," "upward," "downward," "descending," "ascending," and "side" structures, elements and geometries and the like are intended solely for purposes of providing an enabling disclosure and in no way suggest limitations regarding the operative orientation of the exemplary embodiments or any components thereof.

That which is claimed is:

1. A fill limit vent valve assembly for attachment in an aperture of a fuel tank wall, the fill limit vent valve assembly comprising:
    a cap member having a nozzle and a cage, the nozzle defining a vapor-inlet opening, a passageway and a vapor-outlet opening, the passageway interconnecting the vapor-inlet opening and the vapor-outlet opening;
    a carrier stage including a carrier and a sealing element attached to the carrier, the sealing element defining a first seal and a second seal disposed proximate each other, the first seal having a first orifice disposed therein, the second seal having a second orifice disposed therein, the first and second orifices in communication with each other, the first orifice having a first diameter smaller than a second diameter of the second orifice, the carrier configured for axial movement in the cage for engagement of the second seal about the vapor-inlet opening;
    a float stage movably connected to the carrier stage, the float stage including a pivot pin and a float defining a stem, the pivot pin movably disposed on the stem, the sealing element spaced apart from the pivot pin and the vapor-inlet opening in a first valve assembly condition for substantially unrestricted vapor venting; and
    a valve housing attachable to the cap member, the valve housing at least partially disposed within an interior of a fuel tank, the valve housing defining a cavity therein and configured to house the carrier and float stages, the valve housing including a window and a guide channel, the window configured to pass a liquid fuel into the cavity to actuate the float stage such that the pivot pin contacts the first seal to reduce a fuel vapor vent rate in a second valve assembly condition and to limit a fuel level in the fuel tank in a third valve assembly condition, the cage and the guide channel cooperable to control displacement of the float.

2. The valve assembly as in claim 1, wherein the nozzle defines an annular recess thereon, the annular recess configured for seating a seal.

3. The valve assembly as in claim 2, wherein the seal is selected from the group consisting of a sealant, a gasket, an o-ring, and combinations thereof.

4. The valve assembly as in claim 1, wherein the cage defines a vent window therethrough, the vent window in vapor communication with the passageway of the nozzle, the vent window configured to provide at least two fuel vapor vent rates during respective first and second valve assembly conditions.

5. The valve assembly as in claim 4, wherein the vent window is a plurality of vent windows, each vent window being sized and positioned to permit the first fuel vapor vent rate in the first valve assembly condition and to permit the second fuel vapor vent rate in response to an engagement of the pivot pin with the first seal in the second valve assembly condition.

6. The valve assembly as in claim 1, wherein the cage defines a notch therethrough, the notch configured to make the cage flexible relative to the carrier for axial insertion of the carrier in the cage.

7. The valve assembly as in claim 1, wherein the cage defines a ledge and the carrier defines a projection, the projection configured to rest on the ledge to limit an axial movement of the carrier in the first valve assembly condition.

8. The valve assembly as in claim 7, wherein the projection is further configured to space the first seal apart from the pivot pin from about 1 mm to about 4 mm in the first valve assembly condition.

9. The valve assembly as in claim 8, wherein the projection is configured to permit the pivot pin to contact the first seal substantially only in the second and third valve assembly conditions.

10. The valve assembly as in claim 1, wherein the sealing element is overmolded with the carrier.

11. The valve assembly as in claim 1, wherein the second seal defines a circumferential lip configured to seal about the inlet of the nozzle, the second seal flaring from proximate the large orifice to the circumferential lip.

12. The valve assembly as in claim 11, wherein the circumferential lip is disposed substantially flush with a seal seat of the carrier.

13. The valve assembly as in claim 1, wherein the second seal is chamfered relative to the carrier.

14. The valve assembly as in claim 1, wherein the first orifice is about 1 mm to about 5 mm in diameter.

15. The valve assembly as in claim 1, wherein the second orifice is about 12 mm to about 18 mm in diameter.

16. The valve assembly as in claim 1, wherein the first and second orifice are in selective vapor communication with the vapor-inlet opening and cooperably configured to reopen the pivot pin of the float stage from about the first seal at between about 1 kPa to about 3 kPa.

17. The valve assembly as in claim 1, wherein the first and second orifice are in selective vapor communication with the vapor-inlet opening and cooperably configured to reopen the second seal from about the vapor-inlet opening at between about 14 kPa to about 18 kPa.

18. The valve assembly as in claim 1, wherein the stem is dome-shaped in cross-section.

19. The valve assembly as in claim 1, wherein the pivot pin defines a catch and the float defines a ring, the catch configured to catch the ring in a fourth fuel valve assembly condition.

20. The valve assembly as in claim 19, wherein the ring is configured to slidably contact an inner surface of the carrier, the ring and the inner surface cooperable to form a pressure chamber in the carrier in the third and fourth fuel valve assembly conditions.

21. The valve assembly as in claim 20, wherein the pressure chamber defines a pressure of about 0.5 to about 0.95 of a pressure in the fuel tank in the third and fourth fuel valve assembly conditions.

22. The valve assembly as in claim 21, wherein the pressure chamber defines a pressure of between about 5 kPa to about 10 kPa and the pressure in the fuel tank is between about 9.5 kPa to about 11.5 kPa.

23. The valve assembly as in claim 1, wherein the pivot pin defines a first contact surface and a second contact surface, the stem configured as a point-bearing surface relative to the first contact surface such that the first contact surface is tiltable on the stem to align and seal the second contact surface about the first seal in the second fuel valve assembly condition.

24. The valve assembly as in claim 23, wherein the pivot pin the second contact surface and the first seal form a gap therebetween, the gap measuring between about 1 mm to about 4 mm, the gap configured to prevent the pivot pin and the first seal from touching in the first valve condition.

25. The valve assembly as in claim 1, wherein the float defines a stop disposed proximate the stem and the pivot pin defines a stop surface, the stop and stop surface configured to limit an axial movement of the float.

26. The valve assembly as in claim 25, wherein the stop and the stop surface define a space therebetween from about 1 mm to about 2.5 mm in the first and third fuel valve assembly conditions.

27. The valve assembly as in claim 1, wherein the window of the valve housing defines a fuel entry edge, the fuel entry edge configured to permit a liquid fuel to enter the cavity of the valve housing to transition the valve assembly from the second valve assembly condition to the third valve assembly condition.

28. The valve assembly as in claim 27, wherein the window of the valve housing defines a fill-limit edge disposed adjacent the fuel entry edge, the fill-limit edge configured to prevent fuel filling in the third valve assembly condition.

29. The valve assembly as in claim 28, wherein the fill-limit edge is spaced vertically apart from about 1 mm to about 4 mm from the fuel entry edge in a direction of the cap member.

30. The valve assembly as in claim 1, wherein the valve housing defines a hole therethrough, the hole disposed proximate the guide channel and sized to permit a selected amount of a liquid fuel to enter the cavity such that the float and the liquid fuel rise substantially evenly during a first refueling rate until the liquid fuel passes through the window of the valve housing.

31. The valve assembly as in claim 1, further comprising means for attaching the cap member and the valve housing together.

32. The valve assembly of claim 31, wherein the means for attaching includes a retaining projection depending from the cap member and a receptacle defined in the valve housing, the retaining projection configured to snap-fit in the receptacle to hold the cap member and the valve housing together.

33. The valve assembly of claim 32, wherein the retaining projection is configured to flex relative to the valve housing upon axial connection of the cap member and the valve housing.

34. The valve assembly as in claim 1, further comprising a guard depending from one of the cap member and the valve housing, the guard disposed proximate the window and configured to reduce a liquid fuel splash from a liquid fuel entering the window.

35. A valve assembly for attachment in a fuel tank wall, the valve assembly comprising:
   a cap member defining a nozzle and a cage, the nozzle defining a vapor-inlet opening and a vapor-outlet opening in vapor communication with each other;
   a sealing element attached to a carrier, the carrier movably disposed in the cage, the sealing element defining a first seal and a second seal disposed proximate each other, the first seal having a first smaller orifice therethrough, the second seal having a second larger orifice therethrough, the first and second orifices in communication with each other;
   a pivot pin movably disposed on a float, the sealing element disposed apart from the pivot pin and the vapor-inlet opening in an unrestricted vapor venting condition; and
   a valve housing attachable to the cap member, the cage depending into an interior of the valve housing, the valve housing disposed within an interior of a fuel tank and defining a window therethrough, the window configured to pass a fuel into the valve housing to raise the float such that the pivot pin contacts the first seal and lifts the carrier to seal the second seal about the vapor-inlet opening to limit a fuel level in the fuel tank.

36. The valve assembly as in claim 35, wherein the cage defines a vent window therethrough in vapor communication with the passageway of the nozzle, the vent window configured to vent fuel vapor until the pivot pin is sealed against the first seal and the second seal is sealed about the vapor-inlet opening.

37. The valve assembly as in claim 35, wherein the second seal defines a circumferential lip disposed substantially flush with the carrier, the circumferential lip configured to seal about the inlet of the nozzle.

38. The valve assembly as in claim 35, the first smaller orifice is about 1 mm to about 5 mm in diameter.

39. The valve assembly as in claim 35, wherein the second larger orifice is about 4 mm to about 8 mm in diameter.

40. The valve assembly as in claim 35, wherein the float defines a stem depending therefrom in a direction of the first seal.

41. The valve assembly as in claim 40, wherein the stem is dome-shaped in cross-section.

42. The valve assembly as in claim 41, wherein the pivot pin is tiltable on the stem such that the pivot pin is alignable to seal about the first seal.

43. The valve assembly as in claim 41, further comprising a guide channel defined in the valve housing, the guide channel cooperable with the cage to control displacement of the float in the valve housing.

44. The valve assembly as in claim 35, wherein the pivot pin defines a catch and the float defines a ring, the catch configured to catch the ring in a first stage of re-opening.

45. The valve assembly as in claim 44, wherein the ring is configured to slidably contact an inner surface of the carrier, the ring and the inner surface cooperable to form a pressure chamber within the carrier in a non-venting condition.

46. The valve assembly as in claim 45, wherein the pressure chamber defines a pressure of about 0.5 to about 0.95 of a pressure in the fuel tank prior to venting.

47. The valve assembly as in claim 46, wherein the pressure chamber defines a pressure of between about 5 kPa to about 10 kPa and the pressure in the fuel tank is between about 9.5 kPa to about 11.5 kPa.

48. The valve assembly as in claim 35, wherein the valve housing defines a hole therethrough, the hole sized to permit a selected amount of a liquid fuel to enter the valve housing such that the float and the liquid fuel rise substantially evenly during refueling rate.

49. The valve assembly as in claim 35, further comprising a guard depending from one of the cap member and the valve housing, the guard disposed proximate the window and configured to reduce a liquid fuel splash from a liquid fuel entering the window.

50. The valve assembly as in claim 35, wherein the nozzle and the float are disposed offset from each other such that a liquid fuel splash is deflected away from the nozzle and contained in the interior of the valve housing.

51. A fuel tank valve assembly having a nozzle defining a vapor-inlet opening, a passageway, and a vapor-outlet opening in vapor communication with each other, the valve assembly comprising:
a housing configured for attachment to a fuel tank and disposed therein in vapor communication with the vapor-inlet opening, the housing defining an interior having a cage disposed therein;
a carrier slidably mounted in the cage;
a sealing element carried on the carrier, the sealing element defining a first seal and a second seal in vapor communication with each other; and
a float disposed in the interior of the housing, the carrier and second seal respectively disengaged from the float and the vapor-inlet opening in a first valve assembly condition, the float configured to raise the carrier and the sealing element in a third valve assembly condition after a second valve assembly condition such that the second seal seals about the vapor-inlet opening to limit a fuel level in the fuel tank in the third valve assembly condition.

52. The fuel tank valve assembly as in claim 51, wherein the second seal defines a circumferential lip disposed substantially flush with the carrier, the circumferential lip configured to seal about the vapor-inlet opening.

53. The fuel tank valve assembly as in claim 51, wherein the first seal defines a first smaller orifice therethrough and the second seal defines a second larger orifice therethrough.

54. The fuel tank valve assembly as in claim 53, wherein the first smaller orifice is about 1 mm to about 5 mm in diameter.

55. The fuel tank valve assembly as in claim 53, wherein the second larger orifice is about 4 mm to about 8 mm in diameter.

56. The fuel tank valve assembly as in claim 51, wherein the cage defines a vent window therethrough in vapor communication with the vapor-inlet opening, the vent window configured to vent fuel vapor until the second seal is sealed about the vapor-inlet opening.

57. The valve assembly as in claim 51, further comprising a pivot pin movably disposed on the float.

58. The valve assembly as in claim 57, wherein the float defines a stem depending therefrom in a direction of the first seal, the pivot pin tiltably disposed on the stem such that the pivot pin is alignable to seal about the first seal.

59. The valve assembly as in claim 51, wherein the pivot pin defines a catch and the float defines a ring, the catch configured to catch the ring in a first stage of re-opening.

60. The valve assembly as in claim 59, wherein the ring is configured to slidably contact an inner surface of the carrier, the ring and the inner surface cooperable to form a pressure chamber within the carrier in a non-venting condition.

61. The valve assembly as in claim 60, wherein the pressure chamber defines a pressure of about 0.5 to about 0.95 of a pressure in the fuel tank prior to venting.

62. The valve assembly as in claim 51, further comprising a guide channel, the guide channel and the cage cooperable to control movement of the float, the guide channel and the cage formed and sized such that sealing is substantially unaffected due to swelling by heat or immersion in fuel.

63. A fuel tank vent apparatus in vapor communication with an interior of a fuel tank for discharge of fuel vapor from the fuel tank, the fuel tank vent apparatus comprising:
a vent module with a housing adapted to be mounted in a fuel tank aperture, the vent module being formed to include a sealing element slidably mounted in an interior of the housing for movement between a venting position allowing flow of fuel vapor from the interior to a destination outside the vent module and a sealed position preventing flow of fuel vapor from the vent module, the sealing element defining a first seal and a second seal spaced apart in vapor communication with each other and disengaged from respective sealing surfaces in the vent module in the venting position, the first seal having a first orifice disposed therein and the second seal having a second orifice disposed therein, the first orifice defining a first diameter smaller than a second diameter defined by the second orifice such that the sealing element defines a funnel-shape cross section configured to urge a liquid fuel disposed on the sealing element into the interior of the housing.

64. The fuel tank vent apparatus as in claim 63, further comprising a cage attached in the interior of the housing and a carrier slidably disposed in the cage with the sealing element mounted to the carrier.

65. The fuel tank vent apparatus as in claim 64, wherein the second seal defines a circumferential lip disposed substantially flush with the carrier, the circumferential lip configured to seal about a vapor-inlet opening when the carrier lifts the sealing element.

66. The fuel tank vent apparatus as in claim 64, further comprising a float disposed in the interior of the housing, the float configured to raise the carrier and the sealing element in a third valve assembly condition such that the second seal seals about a vapor-inlet opening to limit a fuel level in the fuel tank.

67. The fuel tank vent apparatus as in claim 66, further comprising a pivot pin movably disposed on the float.

68. The fuel tank vent apparatus as in claim 67, wherein the float defines a stem depending in a direction of the first seal, the pivot pin tiltably disposed on the stem such that the pivot pin is alignable to seal about the first seal.

69. The fuel tank vent apparatus as in claim 63, wherein the respective sealing surfaces are an area disposed about a vapor-inlet opening in communication with the interior of the housing and a contact surface on a float.

70. The fuel tank vent apparatus as in claim 69, further comprising a rib depending from one of the float and the valve housing to limit an axial movement of the float.

71. A fuel tank vent apparatus in vapor communication with an interior of a fuel tank for discharge of fuel vapor from the fuel tank, the fuel tank vent apparatus comprising:
a housing adapted to be mounted in a fuel tank aperture;
a cage attached to an interior of the housing; and
a carrier slidably disposed in the cage with a sealing element mounted to the carrier, the sealing element slidably mounted in the interior of the housing for movement between a venting position allowing flow of fuel vapor from the interior to a destination outside the housing and a sealed position preventing flow of fuel vapor from the housing, the sealing element defining a first seal and a second seal spaced apart in vapor communication with each other and disengaged from respective sealing surfaces in the housing in the venting position.

* * * * *